Feb. 18, 1969  K. J. HOFMEISTER ET AL  3,428,813
PHOTODIODES AND HEAT SENSITIVE RESISTORS IN SERIES
CONTROLLING THE SAME CIRCUIT
Filed May 4, 1966

INVENTORS
KONRAD J. HOFMEISTER
LOUIS J. OLCSAN JR.
BY their ATTORNEY

United States Patent Office 3,428,813
Patented Feb. 18, 1969

3,428,813
PHOTODIODES AND HEAT SENSITIVE RESISTORS IN SERIES CONTROLLING THE SAME CIRCUIT
Konrad J. Hofmeister, Mount Lebanon, and Louis J. Olcsan, Jr., Pittsburgh, Pa., assignors to Jones & Laughlin Steel Corporation, Pittsburgh, Pa., a corporation of Pennsylvania
Filed May 4, 1966, Ser. No. 547,490
U.S. Cl. 250—209　　　　　　　　　　　　　　2 Claims
Int. Cl. H01j 39/12

ABSTRACT OF THE DISCLOSURE

The apparatus utilizes two photodiodes having negative resistance-temperature characteristics, each connected in series with a thermistor having a negative resistance-temperature characteristic like that of its associated photodiode, and a source of voltage. The thermistors are mounted close to the photodiodes, and the latter are equally spaced from the source of radiation. The outputs of the two photodiodes are combined and amplified.

---

This invention relates to non-contacting apparatus responsive to the presence or absence of high temperature radiation. It is more particularly concerned with apparatus adapted to signal the presence or absence of a hot object.

Non-contacting apparatus for measuring a dimension of a hot object such as a steel bloom or billet requires some sensing device to indicate the presence or absence of the object to be measured. As such an object emits thermal radiation, it is conventional to use for this purpose a photo-electric device sensitive to such radiation. Such devices are, in general, also sensitive to their operating temperature, and in the past have required auxiliary temperature stabilizing equipment. It is desirable to restrict the field of view of such a sensing device to minimize the heating and other effects of stray radiation. Hot objects of steel, however, oxidize and develop coatings of scale which have a much lower emissivity than the steel. It is not easy to insure the absence of scale in the narrow area sensed by apparatus with a restricted field of view and the indications from prior art devices of this type have, therefore, been accompanied by some uncertainty.

It is an object of our invention to provide non-contacting hot object sensing apparatus having a restricted field of view and a higher degree of certainty than that heretofore available. It is another object of our invention to provide such apparatus which is self-compensating for operating temperature variations over a considerable range. It is another object to provide such apparatus which delivers an output signal of fixed predetermined magnitude when a hot object is present and of zero magnitude when a hot object is absent. Other objects of our invention will appear in the course of the description thereof which follows.

We have invented sensing apparatus using photo-diodes each associated with a thermistor so as to provide compensation for temperature effects over a wide range of operating temperatures. We employ at least two such photo-diode-thermistor arrangements closely spaced from each other and focused each on a relatively restricted area of the object to be detected, together with amplifier and indicator means for these detector elements.

An embodiment of our invention presently preferred by us is illustrated in the attached figures to which reference is now made.

Figure 1:
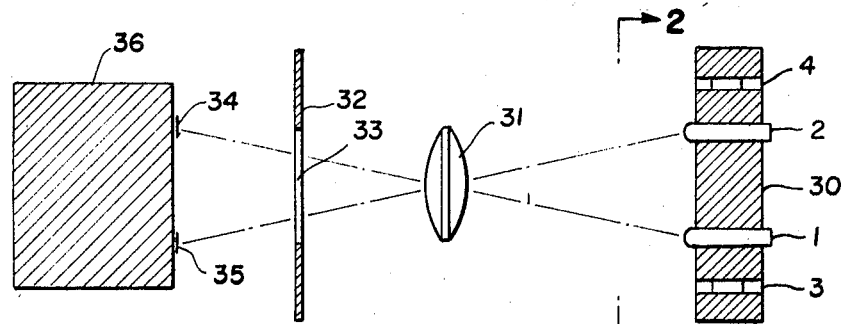
Figure 3:
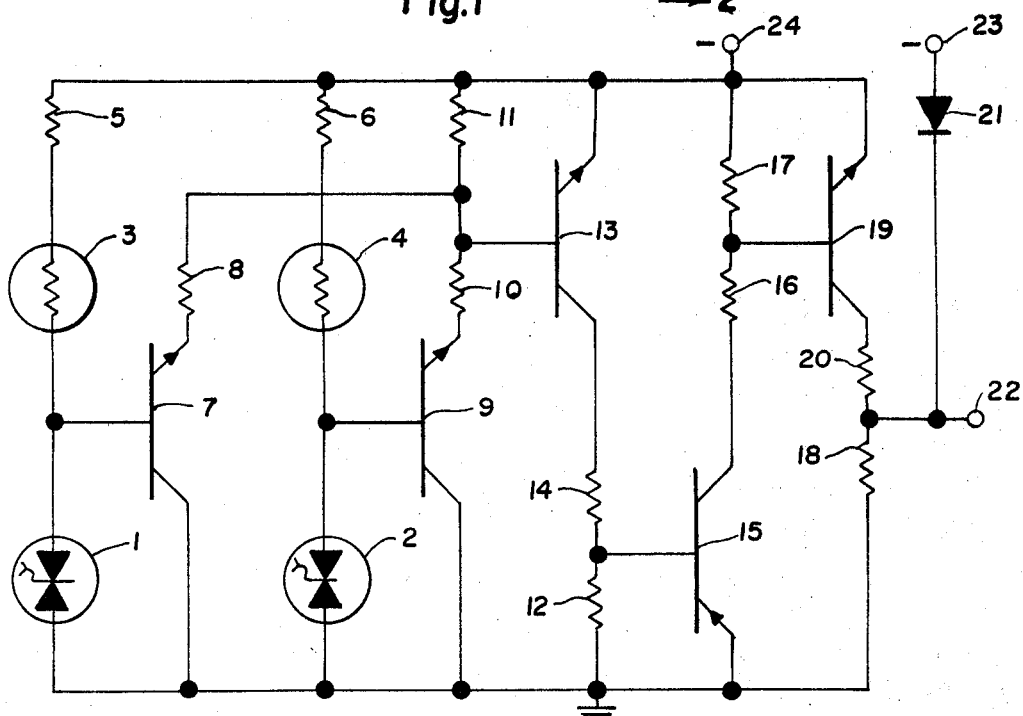
Figure 2:
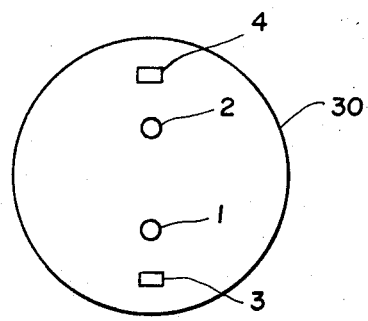

FIGURE 1 is a schematic drawing partly in section of our hot metal detector focused on a hot object. FIGURE 2 is an elevation of the detector element of our FIGURE 1 in the section indicated at 2—2 on that figure. FIGURE 3 is a schematic of the electrical circuit of our apparatus.

Photo-diodes 1 and 2, which are identical within commercial limits, are mounted in a holder 30 a short distance apart. Thermistor 3 is mounted in holder 30 close to photo-diode 1 and thermistor 4 is likewise mounted in holder 30 close to photo-diode 2. Holder 30 is spaced at a distance from the path of travel of the hot objects, one of which carries reference character 36 in the figure. A lens 31 is positioned intermediate holder 30 and the path of travel of hot object 36, and a mask 32 provided with a hole 33 is positioned intermediate lens 31 and the path of travel of hot object 36 so as to reduce the heat from hot object 36 which would otherwise fall on lens 31 and detectors 1 and 2.

One terminal of each photo-diode 1 and 2 is connected to ground. The other terminal of photo-diode 1 is connected to thermistor 3 which in turn is connected to a source of negative potential 24 through resistor 5. The other terminal of photo-diode 2 is likewise connected to thermistor 4 which in turn is connected to source 24 through resistor 6. The junction of photo-diode 1 and thermistor 3 is connected to the base of transistor 7, the collector of which is grounded. Its emitter is connected in series with resistors 8 and 11 to source 24. The junction of photo-diode 2 and thermistor 4 is connected to the base of transistor 9, the collector of which is grounded. Its emitter is connected in series with resistors 10 and 11 to source 24. Transistors 7 and 9, and 13 and 19 to be described, are of the npn type.

The junction of resistors 10 and 11 is connected to the base of transistor 13, the emitter of which is connected to source 24. Its collector is connected to ground in series with resistors 14 and 12. The junction of resistors 14 and 12 is connected to the base of pnp type transistor 15, the emitter of which is grounded. Its collector is connected to source 24 in series with resistors 16 and 17. The junction of resistors 16 and 17 is connected to the base of transistor 19, the emitter of which is connected to source 24. Its collector is connected to ground in series with resistors 20 and 18. The junction of resistors 20 and 18 is connected to output terminal 22 which is also connected to the negative terminal of diode 21. Positive terminal of diode 21 is connected to the negative terminal of a source of voltage 23. The positive terminals of sources 23 and 24 are connected to ground.

The operation of my apparatus will be explained in connection with the figures and the foregoing description.

Lens 31 is adjusted so that photo-diodes 1 and 2 are focused on spaced areas 34 and 35, respectively, of hot body 36. Mask 32 with hole 33, as has been mentioned, is dimensioned to serve as a heat shield. In the absence of radiation incident on photo-diodes 1 and 2, a small dark current flows through them. When radiation falls on photo-diode 1, its resistance is decreased and current flows from ground through photo-diode 1, thermistor 3, and resistor 5 to terminal 24. When radiation falls on photo-diode 2, current likewise flows through thermistor 4 and resistor 6 to terminal 24.

It is an undesirable characteristic of photo-diodes in general that their resistance decreases with increasing temperature. The dark current for a given incident radiation at a photo-diode temperature of 100° C. may be more than twice the dark current for the same radiation at a photo-diode temperature of 25° C. To compensate for this characteristic, we select resistor 5 and thermistor 3 to provide a resistance-temperature characterisitic substantially that of photo-diode 1. Resistor 6 and thermistor 4 are likewise so selected for photo-diode 2. Under these conditions, the voltage across photo-diode 1 is substantially independent of temperature for a given amount of radiation incident thereon, and the same is true for photo-diode 2.

The voltage across photo-diode 1 is amplified by transistor 7 and applied across resistor 11 between the base and the emitter of transistor 13. The voltage across photo-diode 2 is amplified by transistor 9 and applied across the same resistor 11 also to transistor 13. Transistors 7 and 9 and their associate circuits are here called pre-amplifiers to distinguish them from the remainder of our amplifier which is common to the outputs of both pre-amplifiers.

Transistor 13 amplifies signals from photo-diode 1 or photo-diode 2, or from both. If a positive-going signal is applied to the base of either emitter follower transistor 7 or 9, a positive potential therefrom will be applied to the base of transistor 13. This potential causes transistor 13 to conduct. Its collector current develops a voltage across resistor 12 which causes the base of transistor 15 to assume a negative potential with respect to its emitter. Transistor 15 then conducts, applying to the base of transistor 19 a signal positive with respect to the emitter of transistor 19. This signal causes transistor 19 to conduct and its collector current flows through resistor 18, generating a voltage negative with respect to ground at terminal 22. If this voltage exceeds in magnitude the negative voltage applied to terminal 23, the latter becomes positive with respect to terminal 22 and current flows from terminal 23 through diode 21 and resistor 18 in the reverse direction, thus maintaining terminal 22 at the fixed potential of terminal 23. Terminal 22 therefore is either at zero potential in the absence of a signal, or at the potential of terminal 23 in the presence of a signal.

While hot object 36 may be partially or wholly covered with scale in area 34 or area 35, it is unlikely that both those areas, which are separated from each other, will be scaled sufficiently to interfere with the operation of our apparatus. Under exterme conditions our apparatus can comprise three or even more photo-diodes, each mounted close to its compensated thermistor in the holder 30, and each provided with its own pre-amplifier.

The potential of terminal 23 is fixed at any convenient value, such as —6 volts. The potential of terminal 24 is that required by the particular transistors and resistors employed in the amplifier, and is generally on the order of —18 volts. We prefer to employ npn diffused silicon photo-duo-diodes for photo diodes 1 and 2.

We claim:

1. Apparatus responsive to high temperature radiation comprising first and second photo-diode means having negative resistance-temperature characteristics, the photo-diodes being equally spaced from the source of radiation and spaced from each other in a plane normal to radiation from the source, first and second thermistors having negative resistance-temperature characteristics connected in series with the first and second photo-diodes respectively and a source of voltage, means for mounting the first photo-diode and the first thermistor close together and the second photo-diode and second thermistor close together, and amplifier means adapted to amplify the output currents from the first and second photo-diodes so as to produce a single output.

2. Apparatus of claim 1 in which the resistance-temperature characteristic of each thermistor has substantially the same slope as the resistance-temperature characteristic of its associated photo-diode.

References Cited

UNITED STATES PATENTS

| | | | |
|---|---|---|---|
| 3,012,469 | 12/1961 | Clayborne | 250—209 X |
| 3,062,963 | 11/1962 | Douty | 250—209 X |
| 3,104,323 | 9/1963 | Over et al. | 250—209 X |
| 3,210,611 | 10/1065 | Krene | 307—311 X |
| 3,213,282 | 10/1965 | Brouwer | 250—209 X |
| 3,226,551 | 12/1965 | Campbell | 250—209 X |
| 3,235,860 | 2/1966 | Vassil | 307—311 X |

ROBERT SEGAL, *Primary Examiner.*

C. R. CAMPBELL, *Assistant Examiner.*

U.S. Cl. X.R.

250—208; 307—310, 311